United States Patent
Caillouette et al.

(10) Patent No.: US 10,808,140 B2
(45) Date of Patent: Oct. 20, 2020

(54) COATING SYSTEM

(71) Applicant: BASF SE, Ludwigshafen (DE)

(72) Inventors: Lyle A. Caillouette, Farmington, MI (US); Michael L. Praw, Rockwood, MI (US); Jeffrey R. Janos, South Lyon, MI (US); Stacy E. Haynes, Belleville, MI (US)

(73) Assignee: BASF SE, Ludwigshafen am Rhein (DE)

( * ) Notice: Subject to any disclaimer, the term of this patent is extended or adjusted under 35 U.S.C. 154(b) by 358 days.

(21) Appl. No.: 14/906,972

(22) PCT Filed: Jul. 15, 2014

(86) PCT No.: PCT/US2014/046670
§ 371 (c)(1),
(2) Date: Jan. 22, 2016

(87) PCT Pub. No.: WO2015/013064
PCT Pub. Date: Jan. 29, 2015

(65) Prior Publication Data
US 2016/0168412 A1 Jun. 16, 2016

Related U.S. Application Data

(60) Provisional application No. 61/856,835, filed on Jul. 22, 2013.

(51) Int. Cl.

| | |
|---|---|
| C09D 133/08 | (2006.01) |
| C09D 133/14 | (2006.01) |
| C08G 18/36 | (2006.01) |
| C08G 18/62 | (2006.01) |
| C09D 175/04 | (2006.01) |
| C08G 18/65 | (2006.01) |
| C08G 18/79 | (2006.01) |
| C09D 125/14 | (2006.01) |
| E01C 7/08 | (2006.01) |
| E01C 7/30 | (2006.01) |
| E01C 23/16 | (2006.01) |

(52) U.S. Cl.
CPC .......... *C09D 133/08* (2013.01); *C08G 18/36* (2013.01); *C08G 18/6229* (2013.01); *C08G 18/6547* (2013.01); *C08G 18/792* (2013.01); *C09D 125/14* (2013.01); *C09D 133/14* (2013.01); *C09D 175/04* (2013.01); *E01C 7/085* (2013.01); *E01C 7/30* (2013.01); *E01C 23/166* (2013.01)

(58) Field of Classification Search
CPC .. C09D 133/14; C09D 175/04; C09D 125/14; C09D 133/08
See application file for complete search history.

(56) References Cited

U.S. PATENT DOCUMENTS

| | | | | |
|---|---|---|---|---|
| 5,432,221 | A * | 7/1995 | Polaski | C08F 212/12 524/310 |
| 7,358,294 | B2 | 4/2008 | Buckmann et al. | |
| 7,423,077 | B2 | 9/2008 | Wilke et al. | |
| 8,030,430 | B2 | 10/2011 | Fan et al. | |
| 8,293,361 | B2 | 10/2012 | Killilea et al. | |
| 9,221,998 | B2 | 12/2015 | Kaune et al. | |
| 2002/0119321 | A1* | 8/2002 | Kurth | C08G 18/10 428/423.1 |
| 2003/0119918 | A1* | 6/2003 | Croyle | C08F 283/01 516/20 |
| 2006/0079645 | A1 | 4/2006 | Hasegawa et al. | |
| 2007/0202341 | A1 | 8/2007 | Dogan et al. | |
| 2010/0160469 | A1 | 6/2010 | Adkins et al. | |
| 2010/0222541 | A1* | 9/2010 | Zupancic | C07C 67/12 528/74.5 |
| 2012/0029145 | A1* | 2/2012 | Brown | B29C 47/0004 524/590 |
| 2012/0116004 | A1 | 5/2012 | Lu | |
| 2013/0018146 | A1 | 1/2013 | Brinkman et al. | |

FOREIGN PATENT DOCUMENTS

| | | |
|---|---|---|
| CN | 103080174 A | 5/2013 |
| EP | 1 631 610 B1 | 3/2013 |
| JP | 2011-038013 A | 2/2011 |
| WO | WO 03/020791 A1 | 3/2003 |
| WO | WO 2006/052982 A1 | 5/2006 |
| WO | 2006/065345 A1 | 6/2006 |

(Continued)

OTHER PUBLICATIONS businessdictionary.com What is solids content_definition and meaning (Year: 2019).*
BASF Industrial Coatings Joncryl® 507 Technical Data Sheet Dec. (Year: 2010).*
International Search Report for Application No. PCT/US2014/046670 dated Oct. 31, 2014, 4 pages.
BASF, "Industrial Coatings Technical Data Sheet—Joncryl RPD 980-B—Preliminary Data Sheet", Aug. 2012, pp. 1-5.
BASF, "Safety Data Sheet—Sovermol 750," Jun. 20, 2011, pp. 1-6.
BASF, "Industrial Coatings Technical Data Sheet—Sovermol 750", Jul. 2011, pp. 1-3.
BASF, Technical Product Data—Filterpave 7000TC Resin/7000TC Isocyanate, May 9, 2013, 1 page.

(Continued)

*Primary Examiner* — Alicia J Sawdon
(74) *Attorney, Agent, or Firm* — DLA Piper LLP (US)

(57) ABSTRACT

A coating, system comprises 30 to 90 parts by weight of a bioresin component and 10 to 70 parts by weight of an isocyanate component, based on 100 parts by weight of the coating system, and has a percent solids of greater than 60%. The bioresin component comprises an acrylic polymer and a biopolyol formed from a natural oil. A method of forming a coating on a substrate with the coating system comprises the steps of combining the bioresin component and the isocyanate component to form a reaction mixture having a percent solids of greater than 60 percent, applying the reaction mixture onto the substrate, and curing the reaction mixture to form the coating on the substrate.

12 Claims, No Drawings

(56) References Cited

FOREIGN PATENT DOCUMENTS

| WO | 2008/134217 A1 | 11/2008 |
|---|---|---|
| WO | WO 2012/054547 A1 | 4/2012 |
| WO | WO 2012/131050 A1 | 10/2012 |

OTHER PUBLICATIONS

BASF, "Safety Data Sheet—Filterpave 7000TC Resin", Apr. 11, 2013, pp. 1-7.
BASF, "Safety Data Sheet—Filterpave 7000TC Isocyanate", Apr. 11, 2013, pp. 1-8.
Office Action from corresponding Taiwanese Patent Appln. No. 103125178 and its English translation; dated Feb. 21, 2018.
Notification of Reasons for Refusal from corresponding Japanese Patent Appln. No. 2016-529784 and its English translation; dated Mar. 12, 2018.
Decision to Grant from corresponding Russian Patent Appln. No. 201610579; dated Jul. 16, 2018.
Office Action from corresponding Russian Patent Appln. No. 201610579; dated Apr. 19, 2018.
English language abstract for CN 103080174 extracted from espacenet.com database on Aug. 2, 2017, 1 page.
Decision of Refusal from counterpart Japanese Patent Appln. No. 2016-529784 and its English translation; dated Nov. 19, 2018.
Third Office Action from counterpart Chinese Patent Application No. 201480051179.1 dated Sep. 11, 2018, along with its English translation.

\* cited by examiner

US 10,808,140 B2

COATING SYSTEM

RELATED APPLICATIONS

This application is the National Stage of International Patent Application No. PCT/US2014/046670, filed on Jul. 15, 2014, which claims priority to and all the advantages of U.S. Provisional Patent Application No. 61/856,835, filed on Jul. 22, 2013, the content of which is incorporated herein by reference.

FIELD OF THE DISCLOSURE

The subject disclosure generally relates to a coating system and a method of forming a coating on a substrate. More specifically, the subject disclosure relates to a coating system comprising a bioresin component and an isocyanate component which is reactive with the bioresin component.

DESCRIPTION OF THE RELATED ART

Various articles are formed by binding particulate matter together with a polymeric binder. For example, pavements often comprise glass and/or stone particles bound together with polyurethane binder. As another example, running tracks often comprise rubber particles bound together with polyurethane binder. As one last example, particle board typically comprises wood bound together with polyurethane, acrylic, amino, formaldehyde, and other resins.

These articles comprising particulate matter bound together with a polymeric binder can wear, discolor, and even break-down upon use over time and exposure to various physical forces (e.g. heavy traffic), abrasion, UV exposure, chemicals, temperature fluctuation, and moisture. The wear, discoloration, and breakdown of these articles can often be attributed to the breakdown of the polymeric binder, e.g. an aromatic polyurethane binder, upon exposure to various forces and environmental conditions.

As such, coating systems can be applied to the surface of such articles/substrates to improve the durability, as well as the aesthetic appearance, of these articles. To this end, various polymeric coatings are known in the art to improve the durability and the aesthetics of such articles.

From an application perspective, the coating systems of the prior art, can cure too fast or too slow, and the cure rate can vary depending on environmental conditions such as the ambient temperature, the temperature of the substrate, etc. If the coating system cures too fast, trapped bubbles, blisters, and lap lines can be visible in the polymeric coating. Premature cure can even impact adhesion of the polymeric coating to the concrete surface. If the coating system cures too slowly, the polymeric coating can take hours or even days to fully cure, and until the polymeric coating is fully cured, the polymeric coating is vulnerable to indentations, markings, and other surface irregularities.

From an environmental perspective, the coating systems of the prior art can include excessive amounts of solvents and other volatile fluids, which can be harmful to the environment. In addition, the coating systems of the prior art are often formed with components formed from non-renewable resources, such as petroleum.

Further, from a performance perspective, the polymeric coatings of the prior art, such as polyaspartic coatings, can also wear, discolor, and break-down upon use over time. For example, various polymeric coatings of the prior art can yellow over time and exposure to UV and other elements, imparting a color change to a coated substrate.

SUMMARY OF THE DISCLOSURE AND ADVANTAGES

The subject disclosure provides a coating system comprising 30 to 90 parts by weight of a bioresin component and 10 to 70 parts by weight of an isocyanate component, based on 100 parts by weight of the coating system, and has a percent solids of greater than 60%. The bioresin component comprises an acrylic polymer and a biopolyol formed from a natural oil.

A method of forming a coating on a substrate with the coating system comprises the steps of combining the bioresin component and the isocyanate component to form a reaction mixture having a percent solids of greater than 60 percent, applying the reaction mixture onto the substrate, and curing the reaction mixture to form the coating on the substrate.

Advantageously, the coating system is formed, in part, from renewable resources and has a high solids content (e.g. greater than 60% solids). Further, once the components of the coating system are combined to form the reaction mixture, the reaction mixture exhibits excellent application properties such as pot life and tack-free time. Furthermore, the coating formed from the coating system has excellent adhesion to various substrates, is durable, and has excellent UV stability.

DETAILED DESCRIPTION OF THE DISCLOSURE

The subject disclosure provides a coating system comprising a bioresin component and an isocyanate component. Typically, the system is a two-component (or 2K) system. However, it is to be appreciated that reference to the isocyanate component and the bioresin component, as used herein, is merely for purposes of establishing a point of reference for placement of the individual components of the system, and for establishing a parts by weight basis. As such, it should not be construed as limiting the present disclosure to only a 2K system. For example, the individual components of the system can all be kept distinct from each other. The system may also comprise additional components, which may be included with either one or both of the isocyanate and bioresin components, or completely distinct, such as in a third component, as described further below.

The bioresin component comprises an acrylic polymer and a biopolyol formed from a natural oil, each of which are described in turn below.

The bioresin component can include one or more acrylic polymers. As used herein, acrylic polymer refers to both oligomers and polymers which include acrylate units. Further, acrylate units include units formed from acrylates and methacrylates.

The acrylic polymer includes at least one acrylate unit and has at least one functional group which is reactive with an isocyanate functional group. More specifically, the acrylic polymer typically includes at least one of the following isocyanate-reactive functional groups, hydroxy groups, amine groups, epoxy groups, phenol groups, and anhydride groups.

The acrylic polymer is typically a copolymer, i.e., comprises a polymer comprising two or more different units. As is known in the art, a polymer is formed from many "mers" or units. The term "unit" is used herein to describe a unit formed from a particular monomer. For example, a 2-ethylhexyl acrylate unit within a polymer chain which is formed from 2-ethylhexyl acrylate. Further, the acrylic polymer is described as including various percent by weight units, as used throughout this disclosure, percent by weight units refers to percent by weight units, based on the total weight of the acrylic polymer.

As set forth above, the acrylic polymer comprises at least one acrylate unit. Suitable, non-limiting examples acrylate units include methacrylate units, methyl methacrylate units, ethyl methacrylate units, butyl methacrylate units, propyl methacrylate units, methacrylic acid units, acrylic acid units, hydroxyethyl methacrylate units, glycidyl methacrylate units, 2-ethylhexyl acrylate units (2-EHA), as well as the hydroxy-functional acrylate units described below. Of course, these examples of acrylate units are non-limiting examples of acrylate units which can be included in the acrylic polymer.

In a preferred embodiment, the acrylic polymer also comprises hydroxyl-functional units. That is, the acrylic polymer is hydroxy functional. Suitable, non-limiting examples of hydroxy-functional units include glycerol monomethacrylate units, 2-hydroxyethyl acrylate units (HEA), hydroxyethyl methacrylate units (HEMA), hydroxypropyl methacrylate units (HPMA), hydroxybutyl methacrylate units (HBMA), N-(2-hydroxypropyl)methacrylamide units, hydroxypolyethoxy (10) allyl ether units (HEMA 10), poly ethoxy units (10), ethyl methacrylate units, pentaerythritol triacrylate units, poly(propylene glycol) units, 1,1,1-trimethylolpropane diallyl ether units, and 1,1,1-trimethylolpropane mono-allyl ether units. In a particularly preferred embodiment, the acrylic polymer comprises hydroxyalkyl methacrylate units such as HEA, HEMA, HPMA, and HBMA units.

In a preferred embodiment, the acrylic polymer also comprises styrene units. Suitable, non-limiting examples of styrene units include styrene units and α-methylstyrene units. Of course, these examples of styrene units are non-limiting examples of styrene units which can be included in the acrylic polymer.

The acrylic polymer typically comprises: from 5 to 95, alternatively from 5 to 80, alternatively from 5 to 50, alternatively from 20 to 50, alternatively from 30 to 40, percent by weight acrylate units; from 5 to 95, alternatively from 5 to 80, alternatively from 5 to 50, alternatively from 20 to 50, alternatively from 30 to 40, percent by weight hydroxyl-functional acrylate units; and from 5 to 70, alternatively from 5 to 60, alternatively from 5 to 50, alternatively from 20 to 50, alternatively from 30 to 40, percent by weight styrene units.

Of course, the acrylic polymer can also include other units known in the art, i.e., units other than acrylate units, hydroxy-functional acrylate units, and styrene units specifically described herein.

The acrylic polymer typically has: a hydroxyl number of from 50 to 250, alternatively from 100 to 200, alternatively from 135 to 150, mg KOH/g when tested in accordance with ASTM D4274-11; a viscosity at 25° C. of from 500 to 10,000, alternatively from 500 to 8,000, alternatively from 3,600 to 8,000, mPa·sec when tested with a Brookfield Viscometer #4 LV, 60 rpm, 40 sec; and a percent solids of from 60 to 80, alternatively from 68 to 80, alternatively equal to or greater than 60, alternatively equal to or greater than 65, alternatively equal to or greater than 75, alternatively equal to or greater than 80, weight percent when tested in accordance with DIN EN ISO 3251.

Suitable acrylic polymers are commercially available from BASF Corporation of Florham Park, N.J. under the trade name JONCRYL®.

In a preferred embodiment, the acrylic polymer comprises 30 to 35 percent by weight 2-EHA units, from 30 to 35 percent by weight HEMA units, and from 30 to 35 percent by weight styrene units. The acrylic polymer of this preferred embodiment typically has: a hydroxyl number of from 135 to 150, mg KOH/g, a viscosity at 25° C. of from 3,000 to 6,000, mPa·sec, and a percent solids of about 80%. Advantageously, the acrylic polymer of this preferred embodiment has a high solids content, which contributes to the high overall solids content of the coating system, and also, along with the biopolyol, reacts with the isocyanate component to form a coating which has excellent UV, chemical, and solvent resistance, has excellent adhesion and durability, and is hard yet flexible.

The acrylic polymer is typically included in the bioresin component in an amount of from 5 to 50, alternatively from 10 to 40, alternatively from 20 to 30, parts by weight based on 100 parts by weight of the bioresin component. The amount of the acrylic polymer may vary outside of the ranges above, but is typically both whole and fractional values within these ranges. Further, it is to be appreciated that more than one acrylic polymer may be included in the bioresin component, in which case the total amount of all acrylic polymers included is within the above ranges.

The bioresin component also includes the biopolyol. Typically, the biopolyol is formed from a natural oil. The natural oil is an oil obtained form a renewable resource. For example, the natural oil can be extracted from a plant. The natural oil can be triglyceride or a mixture of differing triglycerides. Some suitable natural oils include, but are not limited to, canola oil, castor oil, coconut oil, cottonseed oil, olive oil, palm oil, peanut oil, rapeseed oil, soybean oil, and combinations thereof. The natural oil used to form the biopolyol is typically selected from the group of canola oil, castor oil, coconut oil, cottonseed oil, olive oil, palm oil, peanut oil, rapeseed oil, soybean oil, and combinations thereof. One particularly suitable natural oil is coconut oil, which is derived from the kernel of the coconut palm. That is, in one preferred embodiment, the biopolyol is formed from a natural oil comprising coconut oil. In another preferred embodiment, the biopolyol is formed from a natural oil comprising coconut oil and/or palm oil. Another suitable natural oil is rapeseed oil. Yet another suitable natural oil is castor oil.

As is well known in the art, castor oil is produced directly from a plant source and includes hydroxyl groups. Other natural oils, such as coconut oil, are produced directly from a plant source and do not include hydroxyl groups, but do include carbon-carbon double bonds, which can be oxidized to form hydroxyl groups. That is, the natural oil may be chemically modified, e.g. modified to include hydroxyl groups. For example, the natural oil may be chemically modified via epoxidization followed by a ring opening, trans-esterification, alkoxylation (e.g. ethoxylation, propoxylation, etc.), and other chemical reactions. To this end, the biopolyol can include a natural oil, the reaction product of a natural oil and a compound therewith, and combinations thereof. Said differently, the "formed from" in the phrase "a biopolyol formed from a natural oil" refers to polyols comprising natural oils from renewable resources and also comprising natural oils from renewable resources which are chemically modified, e.g., to include hydroxyl groups.

The biopolyol typically has: a hydroxyl number of from 150 to 350, alternatively from 165 to 330, alternatively from 165 to 175, alternatively from 300 to 330, mg KOH/g when tested in accordance with ASTM D4274-11; a viscosity at 20° C. of from 100 to 5,000, alternatively from 500 to 4,500, alternatively from 2,800 to 4,000, alternatively from 700 to 1,400, mPa·sec when tested in accordance with DIN EN ISO 3219; and a percent solids of greater than 60, alternatively greater than 70, alternatively greater than 80, alternatively greater than 90, alternatively greater than 95, alternatively greater than 99, alternatively about 100, weight percent when tested in accordance with DIN EN ISO 3251.

Suitable biopolyols are commercially available from BASF Corporation of Florham Park, N.J. under the trade name SOVERMOL®.

In a preferred embodiment, the biopolyol is formed from coconut oil. In this embodiment the biopolyol typically has a hydroxyl number of from 300 to 330 mg KOH/g, a viscosity at 20° C. of from 700 to 1,400, mPa·sec, and a percent solids of about 100%. Advantageously, the biopolyol of this preferred embodiment exhibits properties of both a polyether polyol (e.g. hydrolysis stability) and properties of a polyester polyol (e.g. hydrophobicity), and also, along with the acrylic polymer, reacts with the isocyanate component to form a coating which has excellent UV, chemical, and solvent resistance, has excellent adhesion and durability, and is hard yet flexible. The biopolyol of this preferred embodiment allows for high loading of pigments and also contributes to the coating system's self leveling and crack bridging properties.

The biopolyol is typically included in the bioresin component in an amount of from 30 to 90, alternatively from 45 to 75, alternatively from 55 to 65, parts by weight based on 100 parts by weight of the bioresin component. The amount of the biopolyol may vary outside of the ranges above, but is typically both whole and fractional values within these ranges. Further, it is to be appreciated that more than one biopolyol may be included in the bioresin component, in which case the total amount of all biopolyols included is within the above ranges.

The bioresin component optionally includes a supplemental polyol. Of course, the bioresin component may include one or more supplement polyols. The supplemental polyol can be any polyol known in the art which is different than the biopolyol and the acrylic polymer. The supplemental polyol includes one or more OH functional groups, typically at least two OH functional groups. Typically, the supplemental polyol is selected from the group of polyether polyols, polyester polyols, polyether/ester polyols, and combinations thereof; however, other supplemental polyols may also be employed.

The bioresin component may also include various additives. Suitable additives include, but are not limited to, blowing agents, blocking agents, dyes, pigments, diluents, catalysts, solvents, specialized functional additives such as antioxidants, ultraviolet stabilizers, antistats, biocides, fire retardants, fragrances.

The bioresin component typically has: a hydroxyl number of from 50 to 500, alternatively from 100 to 400, alternatively from 135 to 330, alternatively from 200 to 300, mg KOH/g when tested in accordance with ASTM D4274-11; a viscosity at 20° C. of from 200 to 3,000, alternatively from 300 to 1,000, alternatively from 400 to 800, mPa·sec when tested in accordance with DIN EN ISO 3219; and a percent solids of from 60 to 95, alternatively from 75 to 90, alternatively greater than 60, alternatively greater than 65, alternatively greater than 75, alternatively greater than 80, alternatively greater than 85, alternatively greater than 90, alternatively greater than 95, weight percent when tested in accordance with DIN EN ISO 3251.

The bioresin component is typically included in the coating system in an amount of from 30 to 90, alternatively from 40 to 80, alternatively from 50 to 60, parts by weight based on 100 parts by weight of the coating system. The amount of the bioresin component may vary outside of the ranges above, but is typically both whole and fractional values within these ranges.

The bioresin component reacts with the isocyanate component. Specifically, the isocyanate component comprises isocyanate, which reacts with the acrylic polymer and biopolyol of the bioresin component.

Of course, the isocyanate component can comprise one or more different isocyanates. The isocyanate may be a polyisocyanate having two or more functional groups, e.g. two or more NCO functional groups. Suitable isocyanates, for purposes of the present disclosure include, but are not limited to, conventional aliphatic, cycloaliphatic, aryl and aromatic isocyanates. In various embodiments, the isocyanate is selected from the group of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof. In a preferred embodiment, the isocyanate component comprises hexamethylene diisocyanate (HDI) or an isocyanate derived therefrom.

Specific, non-limiting examples of suitable isocyanates include: toluene diisocyanate; 4,4'-diphenylmethane diisocyanate; m-phenylene diisocyanate; 1,5-naphthalene diisocyanate; 3-phenylene diisocyanate; tetramethylene diisocyanate; hexamethylene diisocyanate; hexamethylene diisocyanate isocyanural; 1,4-dicyclohexyl diisocyanate; 1,4-cyclohexyl diisocyanate, 2,4,6-toluylene triisocyanate, 1,3-diisopropylphenylene-2,4-diisocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl benzene-2,4,6-triisocyanate and 1,3,5-triisopropyl benzene-2,4,6-triisocyanate. Other suitable isocyanates include aromatic diisocyanates or isocyanates having one or two aryl, alkyl, arakyl or alkoxy substituents wherein at least one of these substituents has at least two carbon atoms.

Suitable isocyanates are commercially available from BASF Corporation of Florham Park, N.J. under the following trade names: LUPRANATE® and BASONAT®.

The isocyanate component typically has: an NCO content of from 15 to 35, alternatively from 15 to 32, alternatively from 16 to 23, alternatively from 16 to 17, alternatively from 22 to 23, weight percent when tested in accordance with DIN EN ISO 11909; a viscosity at 23° C. of from 100 to 5,000, alternatively from 100 to 4,500, alternatively from 100 to 2,500, alternatively from 100 to 250, alternatively from 2,500 to 4,500, mPa·sec when tested in accordance with DIN EN ISO 3219; and a percent solids of greater than 60, alternatively greater than 70, alternatively greater than 74, alternatively greater than 80, alternatively greater than 85, alternatively greater than 90, alternatively greater than 95, alternatively greater than 99, alternatively about 100, weight percent when tested in accordance with DIN EN ISO 3251.

In a preferred embodiment, the isocyanate component comprises an isocyanurated HDI, such as HDI isocyanural. Isocyanurated HDIs, which are typically highly functional low-viscosity isocyanates, react with the bioresin component to form a coating which has excellent UV, chemical, and solvent resistance, has excellent adhesion and durability, and is hard yet flexible. The isocyanate component of this preferred embodiment typically has an NCO content of from 21.5 to 22.5 weight percent, a viscosity at 23° C. of from 2,500 to 4,500 mPa·sec, and a percent solids of about 100 weight percent.

The isocyanate component is typically included in the coating system in an amount of from 10 to 70, alternatively from 30 to 60, alternatively from 40 to 50, parts by weight based on 100 parts by weight of the coating system. The amount of the isocyanate component may vary outside of the ranges above, but is typically both whole and fractional values within these ranges. Further, it is to be appreciated that more than one isocyanate may be included in the isocyanate component, in which case the total amount of all isocyanates included is within the above ranges.

The coating system, which includes the bioresin component and the isocyanate component, typically has a percent solids of greater than 60, alternatively greater than 65, alternatively greater than 70, alternatively greater than 75, alternatively greater than 80, alternatively greater than 85, alternatively greater than 90, weight percent when tested in accordance with DIN EN ISO 3251. This is the combined percent solids, which is calculated by determining the percent solids of each of the components, determining the amount of each of the components, and calculating the cumulative percent solids of the coating system. For example, if a coating system includes 45 parts by weight of an isocyanate component having 100% solids, and 55 parts by weight bioresin component having 85% solids, the percent solids of the coating system would be calculated as follows: ((45 PBW*1)+(55 PBW*0.85))=92% solids. Alternatively, the percent solids of the coating system itself (as opposed to its components) can be tested in accordance with DIN EN ISO 3251 to determine the percent solids.

A method of forming a coating on a substrate with the coating system is also disclosed herein. The method comprises the steps of combining the bioresin component and the isocyanate component to form a reaction mixture having a percent solids of greater than 60%, applying the reaction mixture onto the substrate, and curing the reaction mixture to form the coating on the substrate. With respect to the method, the components of the coating system, e.g. the isocyanate component, the bioresin component, the acrylic polymer, the biopolyol, etc., are just as described above.

As is indicated above, the method includes the step of combining the bioresin component and the isocyanate component to form a reaction mixture having a percent solids of greater than 60 percent (i.e., the coating system has a percent solids of greater than 60 percent). The bioresin component and the isocyanate component may be combined by any mechanism known in the art to form the reaction mixture. Typically, the step of combining occurs in a bucket, at an application site. Specifically, the components are usually combined and hand mixed in a bucket at a site at which the coating system is to be applied. However, the step of combining can also occur in a mixing apparatus such as a static mixer, impingement mixing chamber, or a mixing pump. The bioresin component and the isocyanate component may also be combined in a spray nozzle. Typically, the bioresin component and the isocyanate component are combined at an isocyanate index of from about 90 to 120, alternatively from 105 to 115.

Once combined, the reaction mixture, i.e., the combined components of the coating system, has excellent pot life properties, especially considering the high solids content of the coating system. Potlife is defined as when the combined viscosity doubles. To this end, the reaction mixture, which is formed when the bioresin component and the isocyanate component are combined, typically has a pot life of greater than 10, alternatively greater than 15, alternatively greater than 20, alternatively greater than 25, alternatively greater than 27, minutes when tested in accordance with ASTM D 2196-05, at 74° F. and 20% RH.

As is also indicated above, the method includes the step of applying the reaction mixture onto the substrate. In one embodiment, the reaction mixture is applied to onto the substrate in a first and a second coat. The reaction mixture can be applied with any application technique, such as brushing, rolling, squeegeeing, pouring, spraying, etc. The particular application technique is selected based on application conditions such as temperature, sunlight exposure, and also on the substrate on which the reaction mixture is applied. Slight variations in the application technique affect the performance properties of the coating. Consequently, certain application guidelines, sometimes including surface preparation guidelines, are often set forth for the application technique.

In one embodiment, the method includes the step of applying a primer to the substrate. Suitable primers are known in the art, e.g. chlorinated polyolefins on polypropylene, and can improve the adhesion of the coating to the substrate.

Once applied, the reaction mixture, i.e., the combined components of the coating system, has excellent self leveling properties, especially considering the high solids content of the coating system.

Further, the reaction mixture typically has a set to touch time (time at which the film will not flow) of equal to or less than 340 minutes, alternatively equal to or less than 330, alternatively equal to or less than 320, alternatively equal to or less than 310, alternatively equal to or less than 300, alternatively equal to or less than 290, alternatively equal to or less than 280, alternatively equal to or less than 270, alternatively equal to or less than 260, alternatively equal to or less than 250, alternatively equal to or less than 240, alternatively equal to or less than 230, alternatively equal to or less than 220, when tested in accordance with ASTM D5895-13, at 74° F. and 20% RH.

Furthermore, the reaction mixture typically has a tack free time (time at which no transfer of coating occurs when touched) of equal to or less than 370 minutes, alternatively equal to or less than 360, alternatively equal to or less than 350, alternatively equal to or less than 340, alternatively equal to or less than 330, alternatively equal to or less than 320, alternatively equal to or less than 330, alternatively equal to or less than 310, alternatively equal to or less than 300, alternatively equal to or less than 290, alternatively equal to or less than 280, alternatively equal to or less than 270, alternatively equal to or less than 260, min when tested in accordance with ASTM D5895-13, at 74° F. and 20% RH.

The coating system of the subject disclosure can be applied to any substrate to improve its durability and aesthetic appearance. The substrate upon which the reaction mixture is applied and the coating is formed can comprise any material including polymers, woods, metals, and concretes. Concrete for purposes of the subject disclosure includes concrete, high-strength concrete, stamped concrete, high-performance concrete, self-consolidating concrete, shotcrete, cellular concrete (lightweight aerated concrete, variable density concrete, foamed concrete, and lightweight or ultra-lightweight concrete), rapid-strength concrete, pre-stressed concrete, reinforced concrete, and even asphalt. The coating can be applied to concrete substrates such as flooring, countertops, patios, driveways, highways/roadways, bridges/overpasses, parking structures, stadiums, precast structures, concrete panels, drainage pipes, tunnels and reservoir structure, concrete masonry units, concrete blocks (e.g. cinder blocks), split faced blocks, natural stone, pavers, stucco, and bricks.

The coating system of the subject disclosure is typically applied substrates comprising particulate matter bound together with a polymeric binder to improve its durability and aesthetic appearance. In one non limiting example, the coating system is applied to a pavement comprising glass and/or stone particles bound together with an aromatic polyurethane binder. In another non-limiting example, the coating system is applied to a running track comprising rubber particles bound together with a polyurethane binder. As one last non-limiting example, the coating system is applied to particle board comprising wood particulate bound together with amino-formaldehyde resin. However, it is expressly contemplated herein that the coating can be applied to articles other than those comprising particulate matter bound together with a polymeric binder. For example, as set forth previously, the coating system can be applied to concrete, plastic, metals, and composite substrates to improve durability and aesthetic appearance.

The method also includes the step of curing the reaction mixture to form the coating on the substrate. The reaction mixture is typically cured over time at ambient conditions at the site of application. However, the reaction mixture can be cured by heat, infrared radiation, ultraviolet radiation, time at ambient conditions, internal inclusion chemical free radical generator, external exposure to a chemical free radical generator, or any combination thereof to form the coating.

In this method, the steps of combining the bioresin component and the isocyanate component to form a reaction mixture, applying the reaction mixture to the substrate, and curing the reaction mixture (to a tack-free state) to form the coating on the substrate is typically collectively conducted in 340 minutes or less, alternatively in 300 minutes or less, alternatively in 260 minutes or less.

The coating comprising the reaction product of the coating system described above is also disclosed herein. The coating, which is formed on the substrate, typically has a thickness of from 0.5 to 10, alternatively from 1 to 4, alternatively from 1.5 to 3.0, mil. The coating exhibits excellent adhesion to various substrates, durability, and weatherability/UV resistance.

The coating exhibits excellent weatherability characteristics. More specifically, the coating typically has: a Δa, shift toward green, of from −2 to 0, alternatively from −1 to 0 when tested for 254 hours in accordance with SAE J-2527; and a Δb, shift toward yellow, of from 0.0 to 0.5, alternatively from 0.0 to 0.1 when tested for 254 hours in accordance with SAE J-2527. Further, the coating typically has: a Δa, shift toward green, of from −3 to 0, alternatively from −2.6 to 0 when tested for 1385 hours in accordance with SAE J-2527; and a Δb, shift toward yellow, of from 0.0 to 3.0, alternatively from 0.0 to 2.0 when tested for 1385 hours in accordance with SAE J-2527 on an Atlas Xenon Weather-ometer Ci65A.

The coating is also tough and durable. Specifically, the coating has a Taber abrasion resistance of less than 85, alternatively less than 80, alternatively less than 75, alternatively less than 70, alternatively less than 65, alternatively less than 60, alternatively less than 55, alternatively less than 50, alternatively less than 45, alternatively less than 44, mg after a post cure of 7 days at 23° C. and when tested in accordance with ASTM D4060 ((1000 cycles, CS-17 mg wheel, weight 1000 grams). Further, the coating has a Taber abrasion resistance of less than 80, alternatively less than 75, alternatively less than 70, alternatively less than 65, alternatively less than 60, alternatively less than 55, alternatively less than 50, alternatively less than 45, alternatively less than 40, mg after a post cure of 7 days at 23° C. and 15 hours at 50° C. and when tested in accordance with ASTM D4060 ((1000 cycles, CS-17 mg wheel, weight 1000 grams).

The coating is also tough and durable even after exposure to UV. Specifically, the coating has a Taber abrasion resistance of less than 90, alternatively less than 85, alternatively less than 80, alternatively less than 75, alternatively less than 70, alternatively less than 65, alternatively less than 60, mg when tested in accordance with ASTM D4060 ((1000 cycles, CS-17 mg wheel, weight 1000 grams) after a post cure of 7 days at 23° C. and exposure accelerated UV aging in a Weather-ometer in accordance with ASTM J2527 for 1385 hours, when tested in accordance with ASTM D4060 ((1000 cycles, CS-17 mg wheel, weight 1000 grams).

The coating also exhibits excellent adhesion to various substrates. For example, the coating passes cross scribe testing when applied to white coil coated aluminum and tested in accordance with ASTM D-3359 and also passes cross hatch testing when applied to white coil coated aluminum and tested in accordance with ASTM D-3002.

The following examples are meant to illustrate the disclosure and are not to be viewed in any way as limiting to the scope of the disclosure.

EXAMPLES

A coating is formed from a Coating System according to the subject disclosure. A Comparative Polyaspartic Coating is formed for purposes of comparison. The Coating System is set forth in Table 1 below. The amounts in Table 1 are in percent by weight, as specified.

TABLE 1

| Bioresin Component | |
|---|---|
| Component | Percent by Weight Based on the Total Weight of the Bioresin Component |
| Biopolyol A | 61.17 |
| Acrylic Polymer A | 26.21 |
| Diluent A | 7.25 |
| Additive A | 0.59 |
| Additive B | 0.06 |
| Additive C | 0.09 |
| Additive D | 0.17 |
| Additive E | 2.97 |
| Additive F | 1.49 |
| Total | 100.00 |

TABLE 1-continued

| Isocyanate Component | |
| --- | --- |
| Component | Percent by Weight Based on the Total Weight of the Isocyanate Component |
| Isocyanate A | 100.00 |

| Coating System | | |
| --- | --- | --- |
| Component | Percent by Weight Based on the Total Weight of the Coating System | Percent Solids (% by wt.) |
| Bioresin Component | 55.00 | 87% |
| Isocyanate Component | 45.00 | 100% |
| Total | 100.00 | 92% |

Biopolyol A is formed from coconut oil and has a hydroxyl number of from 300 to 330 mg KOH/g and a viscosity at 25° C. of from 700 to 1400 mPa·s.

Acrylic Polymer A is formed from HEMA, 2-EHA, and styrene and has a hydroxyl number of from 135 to 150 mg KOH/g and a viscosity at 25° C. of from 3600 to 8000 mPa·s.

Diluent A is propylene carbonate.

Additive A is acetic acid.

Additive B is dibutyltin dilaurate (DBTDL).

Additive C is polyether modified poly-dimethyl-siloxane wetting agent.

Additive D is a polysiloxane defoamer.

Additive E is hydroxyphenylbenzotriazole UV absorber.

Additive F is a hindered-amine light stabilizer.

Isocyanate A is an isocyanurated HDI having an NCO content of from 22 to 23 percent and a viscosity at 23° C. of from 2,500 to 4,500 mPa·s.

Referring now to Table 1, to form the Coating, 55 parts by weight of the Bioresin Component is combined with 45 parts by weight of the Isocyanate Component to form a reaction mixture. As such, the components are combined at an isocyanate index of 110. The reaction mixture is then applied to a substrate and cured to form the Coating.

Still referring to Table 1, the Coating System includes over 25% by weight of the biopolyol which is formed from a renewable resource. Further, the Coating System has a percent solids of 92%.

The properties of the Coating System/reaction mixture and the Coating are tested and set forth in Table 2 below. The properties of a Polyaspartic Coating System/reaction mixture and the Comparative Polyaspartic Coating formed therefrom are also set forth in Table 2 for comparative purposes.

TABLE 2

| | Coating System/ Coating | Comparative Coating System/ Comparative Coating |
| --- | --- | --- |
| Potlife (ASTM D 2196-05, 74° F. 20% RH) Defined as when the mixed viscosity doubles. | 27.0 minutes | 5.4 minutes |
| Set to Touch Time (ASTM D5895-13, 74° F. 20% RH) Defined as when the film will not flow. | 220 minutes | 344 minutes |
| Tack-free Time (ASTM D5895-1374° F. 20% RH) Defined as no transfer of coating when touched. | 255 minutes | 380 minutes |
| Taber Abrasion - 7 Days at 23° C. Cure (ASTM 4060, 1000 cycles, CS-17 mg wheel, weight 1000 grams) | Avg. Wt. Loss = 43.5 g St. Dev = 3.2 | Avg. Wt. Loss = 88.9 g St. Dev = 4.6 |
| Taber Abrasion - 7 Days at 23° C. Cure + 16 hours at 53° C. (ASTM 4060, 1000 cycles, CS-17 mg wheel, weight 1000 grams) | Avg. Wt. Loss = 38.1 g St. Dev = 7.9 | Avg. Wt. Loss = 82.2 g St. Dev = 7.7 |
| Taber Abrasion - Post Weather-ometer, 7 Days at 23° C. Cure Weathering: ASTM J2527, 1385 hours, WOM, Exterior, Xenon, tested on a Atlas Xenon Weather-ometer Ci65A; Abraision: ASTM 4060, 1000 cycles, CS-17 mg wheel, weight 1000 grams | Avg. Wt. Loss = 57.1 g | Avg. Wt. Loss = 91.5 g |
| Adhesion, Cross Scribe (ASTM D3359, on white coil coated aluminum) | Pass | Delamination 100% AF |
| Adhesion, Cross Hatch (ASTM D3359, on white coil coated aluminum) | 1B | Delamination 100% AF |

* Comparative Coating is a polyaspartic coating.

Referring now to Table 2, from an application perspective, the Coating System exhibits excellent potlife, set to touch time, and tack free time, especially when compared to the Comparative Coating System. Further, from a performance perspective, the Coating is durable and exhibits excellent adhesion to the substrate tested, especially when compared to the Comparative Coating.

TABLE 3

Weathering - Color Change
Accelerated weathering on Filterpave ®, i.e., on a substrate comprising particulate glass and an aromatic polyurethane binder and having a 2 mil thick coating thereon.

| Weathering (ASTM J2527, WOM, Exterior, Xenon, tested on a Atlas Xenon Weather-ometer Ci65A) | Coating System/ Coating | | Comparative Coating System/ Comparative Coating | |
| --- | --- | --- | --- | --- |
| Hours Tested | Δa | Δb | Δa | Δb |
| 254 Hours | −.58 | 0.05 | −2.28 | 0.65 |
| 396 Hours | −1.03 | 0.13 | −2.77 | 1.43 |
| 550 Hours | −1.65 | 0.38 | −3.08 | 2.19 |
| 1031 Hours | −2.40 | 1.14 | −3.18 | 3.31 |
| 1385 Hours | −2.62 | 1.81 | −3.13 | 3.95 |

Referring now to Table 3, from a weathering perspective, the Coating exhibits excellent UV stability on FILTERPAVE®, i.e., on a substrate comprising particulate glass and an aromatic polyurethane binder and having a 2 mil thick coating thereon. Notably, the Coating exhibits significantly less color change, represented by Δa and Δb, than the Comparative Coating over a wide range of exposures (i.e., hours tested). Specifically, less change in Δa is better, and lower (or closer to 0) Δb is better with respect to weatherability. As such, the Coating has superior weatherability to that of the Comparative Coating system.

TABLE 4

Weathering - Color Change
Accelerated weathering on coil coated white aluminum substrate having a 2 mil thick coating thereon.

| Weathering (ASTM J2527, WOM, Exterior, Xenon, tested on a Atlas Xenon Weather-ometer Ci65A) | Coating System/ Coating | | Comparative Coating System/ Comparative Coating | |
|---|---|---|---|---|
| Hours Tested | Δa | Δb | Δa | Δb |
| 254 Hours | 0.04 | 0.08 | −0.05 | 0.39 |
| 396 Hours | 0.02 | 0.12 | −0.10 | 0.60 |
| 550 Hours | 0.0 | 0.22 | −0.16 | 0.82 |
| 1031 Hours | −0.02 | 0.32 | −0.24 | 1.12 |
| 1385 Hours | −0.02 | 0.37 | −0.27 | 1.28 |

Referring now to Table 4, from a weathering perspective, the Coating also exhibits excellent UV stability on a coil coated white aluminum substrate. Once again, the Coating exhibits significantly less color change, represented by Δa and Δb, than the Comparative Coating over a wide range of exposures (i.e., hours tested). Specifically, less change in Δa is better, and lower (or closer to 0) Δb is better with respect to weatherability. As such, the Coating has superior weatherability to that of the Comparative Coating system.

In summary, the Coating System exhibits excellent pot-life, set to touch time, and tack free time, especially when compared to the Comparative Coating System. Further, the Coating, which is formed from the Coating System, is durable and exhibits excellent adhesion to various substrates and abrasion resistance (even after weathering), especially when compared to the Comparative Coating. Notably, the excellent performance properties of the Coating, e.g. abrasion resistance and UV resistance, are achieved at a coating thickness of only 2 mil.

It is to be understood that the appended claims are not limited to express and particular compounds, components, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described in an illustrative manner, and it is to be understood that the terminology which has been used is intended to be in the nature of words of description rather than of limitation. Obviously, many modifications and variations of the present disclosure are possible in light of the above teachings. It is, therefore, to be understood that within the scope of the appended claims, the present disclosure may be practiced otherwise than as specifically described.

What is claimed is:

1. A coating system comprising:
   (A) 50 to 60 parts by weight of a bioresin component, based on 100 parts by weight of the coating system, said bioresin component comprising;
      (i) 20 to 30 parts by weight of an acrylic polymer based on 100 parts by weight of the bioresin component, said acrylic polymer having a hydroxyl number of from 135 to 150 mg KOH/g and a viscosity of from 3,600 to 8,000 mPa·s at 25° C., and
      (ii) 55 to 65 parts by weight of a biopolyol formed from coconut oil based on 100 parts by weight of the bioresin component, said biopolyol having a hydroxyl number of from 300 to 330 mg KOH/g and a viscosity of from 700 to 1,400 mPa·s at 25° C.; and
   (B) 40 to 50 parts by weight of an isocyanate component that is isocyanurated hexamethylene diisocyanate (HDI) having an NCO content of from 22 to 23 weight percent and a viscosity at 23° C. of from 2,500 to 4,500 mPa·s, based on 100 parts by weight of the coating system, said isocyanate component reactive with said bioresin component;
   wherein said coating system has a percent solids of greater than 90 percent, and
   said acrylic polymer comprises from 5 to 50 percent by weight 2-ethylhexyl acrylate units, from 5 to 50 percent by weight hydroxyethyl methacrylate units, and from 5 to 50 percent by weight styrene units.

2. A coating system as set forth in claim 1 wherein said acrylic polymer comprises from 30 to 40 percent by weight 2-ethylhexyl acrylate units, from 30 to 40 percent by weight hydroxyethyl methacrylate units, and from 30 to 40 percent by weight styrene units.

3. A coating comprising the reaction product of the coating system of claim 1.

4. A coating as set forth in claim 3 having a thickness of from 0.5 to 10 mil.

5. A coating as set forth in claim 3 having a Aa of from −2 to 0 and a Ab of from 0.0 to 0.50 when tested for 254 hours in accordance with SAE J-2527.

6. A coating as set forth in claim 3 having a Taber abrasion resistance of less than 60 mg when tested in accordance with ASTM D4060 (1000 cycles, CS-17 mg wheel, weight 1000 grams).

7. A method of forming a coating on a substrate with the coating system as set forth in claim 1, said method comprising the steps of:
- (A) combining 50 to 60 parts by weight of the bioresin component and 40 to 50 parts by weight of the isocyanate component to form a reaction mixture having a percent solids of greater than 90 percent;
- (B) applying the reaction mixture onto the substrate; and
- (C) curing the reaction mixture to form the coating on the substrate.

8. A method as set forth in claim 7 wherein the bioresin component and the isocyanate component are combined at an isocyanate index of from 90 to 120.

9. A method as set forth in claim 7 wherein the reaction mixture has a pot life of greater than 10 minutes when tested in accordance with ASTM D 2196-05, at 74° F. and 20% RH.

10. A method as set forth in claim 7 wherein the reaction mixture has a set to touch time of equal to or less than 340 minutes, when tested in accordance with ASTM D5895-13 at 74° F. and 20% RH and/or a tack free time of equal to or less than 370 minutes, when tested in accordance with ASTM D5895-13at 74° F. and 20% RH.

11. A method as set forth in claim 7 wherein the substrate comprises particulate matter bound together with a polymeric binder.

12. A method as set forth in claim 11 wherein the substrate is further defined as a pavement comprising glass and/or stone particles bound together with a polyurethane binder.

* * * * *